United States Patent [19]

Auslander et al.

[11] Patent Number: 5,129,088
[45] Date of Patent: Jul. 7, 1992

[54] DATA PROCESSING METHOD TO CREATE VIRTUAL DISKS FROM NON-CONTIGUOUS GROUPS OF LOGICALLY CONTIGUOUS ADDRESSABLE BLOCKS OF DIRECT ACCESS STORAGE DEVICE

[75] Inventors: Marc A. Auslander, Millwood, N.Y.; Albert Chang, Austin, Tex.; Stephen P. Morgan, Austin, Tex.; John T. O'Quin, II, Austin, Tex.; John C. O'Quin, III, Austin, Tex.

[73] Assignee: International Business Machines Corporation, Armonk, N.Y.

[21] Appl. No.: 547,424

[22] Filed: Jul. 3, 1990

Related U.S. Application Data

[63] Continuation of Ser. No. 126,814, Nov. 30, 1987, abandoned.

[51] Int. Cl.⁵ .............................................. G06F 12/02
[52] U.S. Cl. ............................ 395/700; 364/DIG. 1; 364/282.2; 364/281; 364/232.2; 364/236.2; 364/245; 364/246
[58] Field of Search ................................ 364/200, 900

[56] References Cited

U.S. PATENT DOCUMENTS

| | | | |
|---|---|---|---|
| 4,310,883 | 1/1982 | Clifton et al. | 364/200 |
| 4,434,487 | 2/1984 | Rubinson et al. | 364/200 |
| 4,435,752 | 3/1984 | Winkelman | 374/10 |
| 4,467,421 | 8/1984 | White | 364/200 |
| 4,511,964 | 4/1985 | Georg et al. | 364/200 |
| 4,601,012 | 7/1986 | Aiken, Jr. | 364/900 |
| 4,761,737 | 8/1988 | Duvall et al. | 364/200 |
| 4,819,159 | 4/1989 | Shipley et al. | 364/200 |

OTHER PUBLICATIONS

Gear, C. William, "Computer Organization and Programming", McGraw-Hill Book Company, pp. 290–292. copyright 1980.

L. J. Waguespack, "Automated Storage Management", IBM Technical Disclosure Bulletin, vol. 17, No. 9, Feb. 1975, pp. 2542–2543.

Primary Examiner—Kevin A. Kriess
Attorney, Agent, or Firm—Robert M. Carwell

[57] ABSTRACT

A data processing method for storing groups of related information in a storage subsystem of a data processing system in which the storage subsystem includes one or more storage devices having a plurality of block addressable storage locations (blocks or sectors) each of which stores a predetermined fixed number of bytes of said information. The method includes the step of establishing allocatable increments of storage, called physical partitions, which comprise a predetermined number of contiguous addressable blocks, and initially allocating, in response to a request to the operating system, a preselected number of partitions for each group of related information, where the partitions in each group are not necessarily physically contiguous and where the number that is selected is the minimum number of partitions required to store the group of related information. The method further includes the step of automatically allocating one or more additional partitions, located physically on any device, to a previously allocated group of related partitions, dynamically in response to another request of the operating system. A group of partitions that have been allocated to store a group of related information, such as individual files that are related in a hierarchical file system, is called a "Logical Volume". Logical Volumes may be further combined for administration and data management reasons into a "Volume Group".

23 Claims, 9 Drawing Sheets

DIRECTORY FILES ARE NOT UNDERLINED

|      | 000 | 008 | 010 | 018 | 020 | 028 | 030 | 038 |
|------|-----|-----|-----|-----|-----|-----|-----|-----|
| 000  | PV0 | PV1 | pv0 | pv1 | LV0 | lv0 | VGD | vgd |
| 040  | ND0 | ND1 | ND2 | ND3 | ND4 | ND5 | ND6 | ND7 |
| 080  |     |     |     |     |     |     |     |     |
| 0C0  |     |     |     |     |     |     |     |     |
| 100  |     |     |     |     |     |     |     |     |
| 140  |     |     |     |     |     |     |     |     |
| 180  |     |     |     |     |     |     |     |     |
| 1C0  |     |     |     |     |     |     |     |     |
| 200  |     |     |     |     |     |     |     |     |
| 240  |     |     |     |     |     |     |     |     |

PP0

PVi = Physical Volume Descriptor i (Primary Copy)
pvi = Physical Volume Descriptor i (Secondary Copy)
LVi = Logical Volume Descriptor i (Primary Copy)
lvi = Logical Volume Descriptor i (Secondary Copy)
VGD = Volume Group Descriptor (Primary Copy)
vgd = Volume Group Descriptor (Secondary Copy)
NDi = Name Descriptor i
PPi = Physical Partition i

FIG. 5

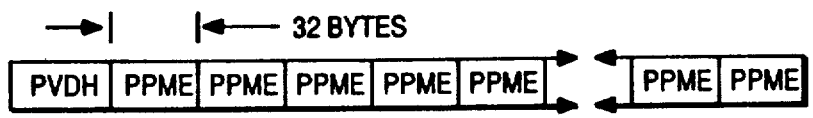

PVDH = PHYSICAL VOLUME DESCRIPTOR HEADER
PPME = PHYSICAL PARTITION MAP ENTRY

FIG. 6

LVDH = LOGICAL VOLUME DESCRIPTOR HEADER
LVME = LOGICAL VOLUME MAP ENTRY

VGDH = VOLUME GROUP DESCRIPTOR HEADER
VGME = VOLUME GROUP MAP ENTRY
VGDT = VOLUME GROUP DESCRIPTOR TRAILER

RB = RELOCATE BLOCK

DATA PROCESSING METHOD TO CREATE VIRTUAL DISKS FROM NON-CONTIGUOUS GROUPS OF LOGICALLY CONTIGUOUS ADDRESSABLE BLOCKS OF DIRECT ACCESS STORAGE DEVICE

This is a continuation of U.S. patent application Ser. No. 07/126,814 filed Nov. 30, 1987 now abandoned.

FIELD OF INVENTION

This invention relates in general to data processing methods for use in data processing systems for allocating physical storage space on a secondary storage device and in particular to an improved method which automatically adjusts the allocated size of a virtual disk dynamically as additional storage space is required by the system.

CROSS REFERENCED APPLICATIONS

U.S. patent application Ser. No. 07/127,000, now abandoned and filed concurrently herewith in the name of Blount et al, entitled "Method for Reducing Disk I/O Accesses in a Multi-processor Clustered Type Data Processing System", is directed to a method for managing the storage of data in a shared virtual memory data processing system having a plurality of interconnected processor units, which permits a page fault which occurs in one processing unit to be serviced by transferring a copy of the requested page from the main memory of another processor unit whenever such a copy exists, rather than performing an I/O paging operation to the disk file of the processor unit which experienced the page fault.

U.S. patent application Ser. No. 07/126,820, now abandoned and filed concurrently herewith in the name of Blount et al, entitled "Method for Maintaining System Availability in a Multi-processor Data Processing System Employing a Shared Virtual Memory, is directed to a method of maintaining availability that permits an aborted transaction being processed by one processor unit to be restarted by another processor unit using a copy of the information as it existed in the others unit's memory at the start of the aborted transaction.

BACKGROUND OF THE INVENTION

The prior art discloses a number of data processing systems which employ disk storage devices for storing data employed by the system. These devices store various types of information such as the operating system under which the micro-processor operates, different application programs that are run by the system and information that is created and manipulated by the various application programs.

Disk storage devices have generally comprised one or more magnetic disks having a plurality of concentric tracks which are divided into sectors or blocks. Each surface of a disk generally stores information and disk drives are configured with multiple disks and multiple magnetic heads to permit one access mechanism to position the heads to one of several concentric recording tracks. Most current disk drives employ an addressing convention that specifies a physical storage location by the number of the cylinder (CC), the number of the magnetic head (H) and the sector number (S).

The number of the cylinder is also the number of the tracks where multiple heads are employed and the head number is equivalent to the disk surface in a multi-disk configuration. The "CCHS" addressing format is employed independent of the capacity of the disk file since it is capable of addressing any configuration that may exist.

The capacity of disk storage devices measured in terms of bytes is dependent on the recording technology employed, the track density, disk size and the number of disks. As a result disk drives are manufactured in various capacities, data rates and access times.

Most data processing systems generally employ a number of disk drives for storing data. Since each device is a failure independent unit it is sometimes advantageous to spread the data to be stored over a number of smaller capacity drives rather than having one large capacity device.

The former configuration permits a copy of critical data to be stored in a separate device which can be accessed in the primary copy is not available.

The task of allocating disk storage space in the system is generally the responsibility of the operating system. Unix* type operating system such as the IBM AIX operating system which is employed on the IBM PC RT engineering workstation have a highly developed system for organizing files.

*Trademark of ATT
Trademark of IBM

In Unix parlance a "file" is the basic structure that is used for storing information that is employed in the system. For example a file may be a directory which is merely a listing of other files in the system, or a data file.

Each file must have a unique identifier. A user assigns a name to a file and the operating system assigns an inode number and a table is kept to translate names to numbers. A file name is merely a sequence of characters and is generally limited to approximately 14 characters. Files may be organized by assigning related files to the same directory, which characteristically is another file with a name and which merely lists the name and inode number of the files stored in that directory.

The AIX operating system also organizes file directories in groups which are given a file name since they are also considered to be a file. The resultant organization is known as a hierarchical file system which resembles an inverted tree structure with the root directory at the top and a multi-level branching structure descending from the root. Both directories and non-directory type files can be stored at each level. Files that are listed by name in a directory at one level are located at the next lower level. A file is identified in the hierarchical file system by specifying its name preceded by the description of the path that is traced from the root level to the named file. The path descriptor is in terms of the directory names through which the path descends. If the current directory is the root directory the full path is expressed. If the current directory is some intermediate directory, the path description may be shortened to define the shorter path.

The various files of the operating system are themselves organized in a hierarchical file system. For example a number of subdirectories depend from the root directory and list files that are related. The subdirectories have names such as / which stores the AIX kernel files; /bin which store the AIX utilities, /tmp which stores temporary files; and /u which store the users files.

As indicated previously the task of assigning AIX files to specific addressable storage units on the disk drive is the responsibility of the operating system. Most operating systems include a command which functions to install one or more file systems onto the disk drive. An "install" command stores the files in contiguous blocks on the disk drive which are in a pre-designated area on the address range of the disk file. Prior to actually assigning a file to disk blocks, a determination is made to divide the available disk storage space of the storage subsystem into a number of different areas so each area can store files having the same general function. These assigned areas are often referred to as virtual disks. The term mini-disk is used in the AIX system and the term A-disk in IBM's VM system.

Several advantages are obtained from the standpoint of management and control when files having the same characteristics are stored in one defined area of the disk drive. For example, a certain group of files may not be changed at all over a certain period time while others may change quite rapidly so that they would be backed up at different times. It is also simpler for the administrator to assign these files to a virtual disk in accordance with their function and manage all the files in one group the same.

The above are just two examples of many where the provision of virtual disks simplifies the administration and control by the operating system of the storage of files in the storage subsystem.

Since the IBM PC RT is capable of running both the AIX operating system and the PC-DOS operating system, the storage of different operating systems on different virtual disks made the management and control the system much easier, since each virtual machine effectively had what appeared to be its own storage subsystem involving a minidisk.

The size of the virtual disk that is created in the AIX operating system cannot be dynamically changed once it has been established. While any size can be selected up to the actual capacity of the disk device it can only be changed by direction of the system administrator and certain AIX utilities. For some minidisks, selecting the initial capacity is a relatively straight forward operation in that the size of all the files to be placed on that minidisk are known and except for program updates that occur infrequently, the capacity remains relatively constant over a reasonable period of time. At the other extreme, an area of the disk drive i.e., a minidisk must be reserved for paging space and the amount of paging space that will be required will vary considerably over a reasonable period of time.

Similarly, the space required for user's data files can vary considerably over a short period of time. Selecting a capacity for the virtual disk to accommodate the worst case condition generally results in unused space for much of the time. Assigning a capacity less than that required for the worst case condition may result in inconvenient reallocation of the disk space.

Virtual disks with predetermined capacities that are not dynamically variable to meet current needs always result in less than optimum usage of disk storage space and require more active involvement of the system administrator to insure optimum system performance.

Another problem with virtual disks that have a fixed capacity occurs when the total storage capacity of the system requires more than one disk device. Since virtual disks are created by assigning contiguous disk blocks, which is the basic unit of addressability in the storage subsystem, it is not practical to create a virtual disk that extends across two physical devices. Virtual disks which are on a single disk device therefore often result in wasted free space that is not large enough to support an individual virtual disk. The space is therefore sometimes added to the last virtual disk created merely because it would otherwise be wasted.

The present invention is directed to a method of allocating space on the disk drives of a data processing system which avoids the above described problems encountered with virtual disks whose storage capacities cannot be varied dynamically as the capacity requirements change.

SUMMARY OF THE INVENTION

In accordance with the new data processing method, a physical partition comprising a plurality of physically contiguous disk blocks or sectors is established as the basic unit of space allocation, while the disk block is kept as the basic unit of addressability of the disk file. A plurality of physical partitions are grouped together and called a physical volume. A plurality of physical volumes that are grouped together is referred to as a volume group. The number of physical blocks contained in each physical partition and the number of physical partitions in each physical volume is fixed when the physical volume is installed into the volume group. Stated differently, all physical partitions in a physical volume group are the same size. Different volume groups may have different partition sizes.

when an AIX file system, i.e., a groups of related files, is to be installed on the system, a logical volume is created which includes only the minimum number of physical partitions on the disk required to store the file system. As more storage space is needed by the file system, the logical volume manager allocates an additional physical partition to the logical volume. The individual physical partitions of the logical volume may be on different disk drives.

A partition map is maintained by the logical volume manager which specifies the physical address of the beginning of each physical partition in terms of its device address and block number on the device, to assist in correlating logical addresses provided by the system to real addresses on the disk file.

It is therefore an object of the present invention to provide an improved data processing method for installing files on a data processing system.

Another object of the present invention is to provide an improved data processing method for installing predetermined groups of individual data processing type files on a data processing system.

A further object of the present invention is to provide an improved method of installing information on a data processing system in which the storage capacity of the device where the information is stored is used more effectively.

A still further object of the present invention is to provide an improved method of installing information on a data processing system in which the storage space that was initially allocated on the storage device may be dynamically changed in an efficient manner without adversely affecting the other files that are stored on the device.

A still further object of the present invention is to provide an improved method for installing information that is organized into a hierarchical type file system comprising a large plurality of individually named files on a plurality of disk storage devices in a data processing system in which different files belonging to the same group of related files may be stored on different storage devices.

Objects and advantages other than those mentioned above will become apparent from the following discussion when read in connection with the drawings.

BRIEF DESCRIPTION OF THE DRAWING

FIG. 5 illustrates the general layout of the non-reserved area of a Physical Volume.

FIG. 6 illustrates the Physical Volume Descriptor Data Structure Layout.

DESCRIPTION OF THE PREFERRED EMBODIMENT

Figure 1:
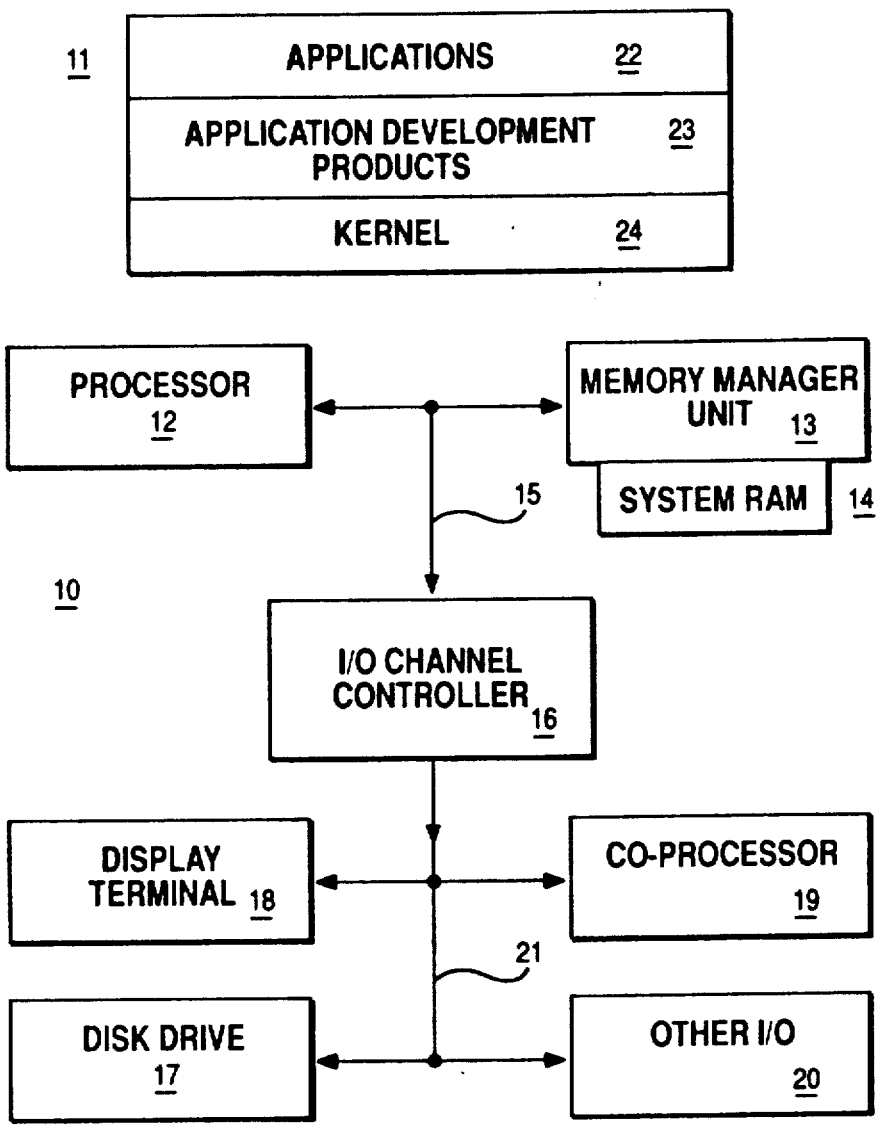
FIG. 1 is a functional block diagram of a data processing system in which the method of the present invention may be advantageously employed.

FIG. 1 illustrates functionally a typical data processing system 10 in which the method of the present invention for allocating storage space. As shown in FIG. 1, the system hardware 10 comprises a microprocessor 12, a memory manager unit 13, a main system memory 14, an I/O channel controller 16 and an I/O bus 21. A number of different functional I/O units are shown connected to bus 21 including the disk drive 17. The information that is stored in the system is shown functionally by block 11 in FIG. 1 and comprises generally a number of application programs 22, the operating system 24 which in this instance may be assumed to be the AIX operating system. Also shown is a group of application development programs which may be tools used by program development personnel during the process of developing other programs.

An example of a commercial system represented by FIG. 1 is the IBM PC RT engineering workstation which employs the AIX operating system.

The AIX operating system is a Unix type operating system and employs many of its features including system calls and file organization.

Figure 2:
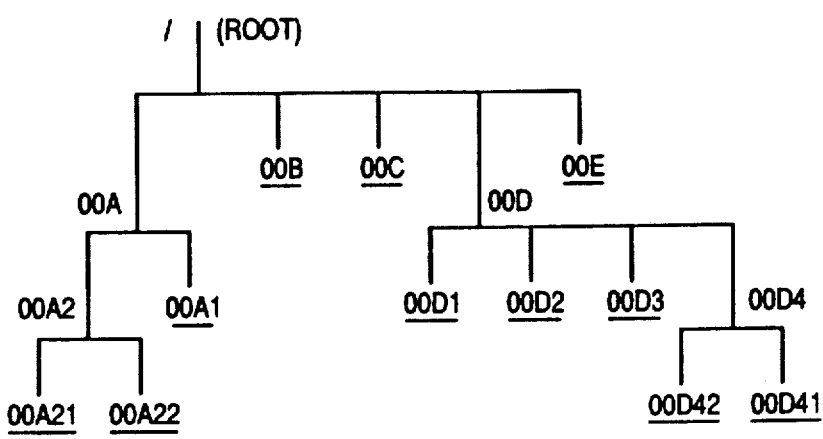
FIG. 2 is a diagrammatic illustration of the hierarchical file system organization of the files containing the information to be stored on the system shown in FIG. 1.

FIG. 2 illustrates the file organization structure of the AIX operating system. The basic unit of information stored is termed a "file". Each file has a name such as "my_file.001". Files may be grouped together and a list generated of all file names in the group. The list is called a directory and is per se a file, with a name such as "my_direct.010". The organization shown in FIG. 2 is called an inverted tree structure since the root of the file organization is at the top. The root level of the organization may contain directory files and other type files. As shown in FIG. 2, a root directory file lists the names of other files 00A, 00B, 00C, 00D, and 00E. The files listed in a directory file at one level appear as files at the next lower level.

The file name includes a user assigned name and a path definition. The path definition begins at the root directory which, by convention is specified by a "slash character, " (/) followed by the file name or the directory name that is in the path that must be traced to reach the named file.

Each of the program areas shown in block 11 in FIG. 1 includes a large number of individual files which are organized in the manner shown in FIG. 2. The term "File System" is used to identify a group of files that share a common multi-level path or a portion of their respective multi-level paths.

The method of the present invention functions to allocate storage space on the disk drive 17 shown in FIG. 1 for all of the files represented in block 11 of FIG. 1 and the files that would be represented on the hierarchical storage system shown in FIG. 2.

Figure 3:
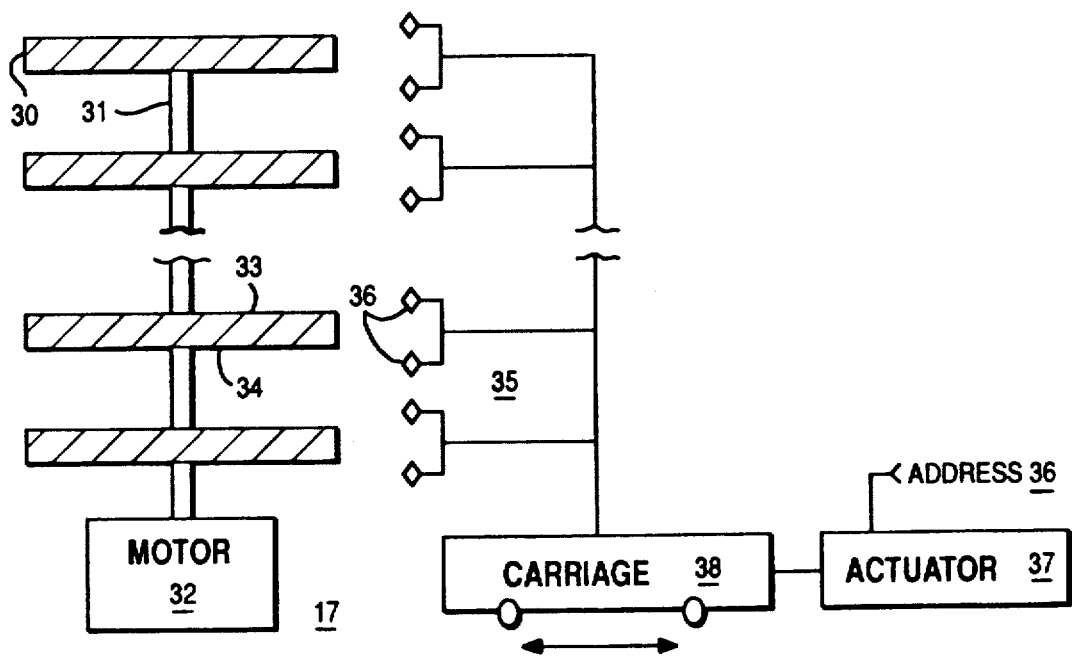
FIG. 3 is a diagrammatic illustration of a disk file storage device shown functionally in FIG. 1.

The disk drive 17 in practice may comprise a plurality of individual disk drives. One such device is shown diagrammatically in FIG. 3. The device as shown in FIG. 3 comprises a plurality of circular magnetic disks 30 which are mounted on a shaft 31 which is rotated at a constant speed by motor 32. Each surface 33 and 34 of the disk 30 is coated with magnetic material and has a plurality of concentric magnetic tracks.

The disk drive 17 further includes a mechanism 35 for positioning a plurality of magnetic transducers 36, one of each being associated with one surface, conjointly to one of the concentrically recording track positions in response to an address signal 36 supplied to actuator 37 attached to move carriage 38. One recording track on each surface of each disk belongs to an imaginary cylinder of recording tracks that exist at each track position.

The physical address tot he disk drive takes the form of a five byte address designated "CCHS" where CC represents the cylinder or track number, H represents the number assigned to the magnetic head or transducer which also corresponds to the disk surface since there is one head per surface, and S represents the sector or block number of a portion of the track. The block is established as the smallest unit of data that can be addressed on the device.

It should be assumed that a block consists of 512 byte storage positions and that there are 36 blocks per track. For system addressing purposes the blocks in the file can be numbered sequentially starting at 0 and a conversion made from a block number address to a real physical address by simple mathematical calculation.

From a programming standpoint a disk drive is sometimes referred to as a Physical Volume (PV) and is viewed as a sequence of disk blocks. A Physical Volume has one device address and cannot include two separate disk devices since each device has a separate accessing mechanism and requires a unique address.

Figure 4:
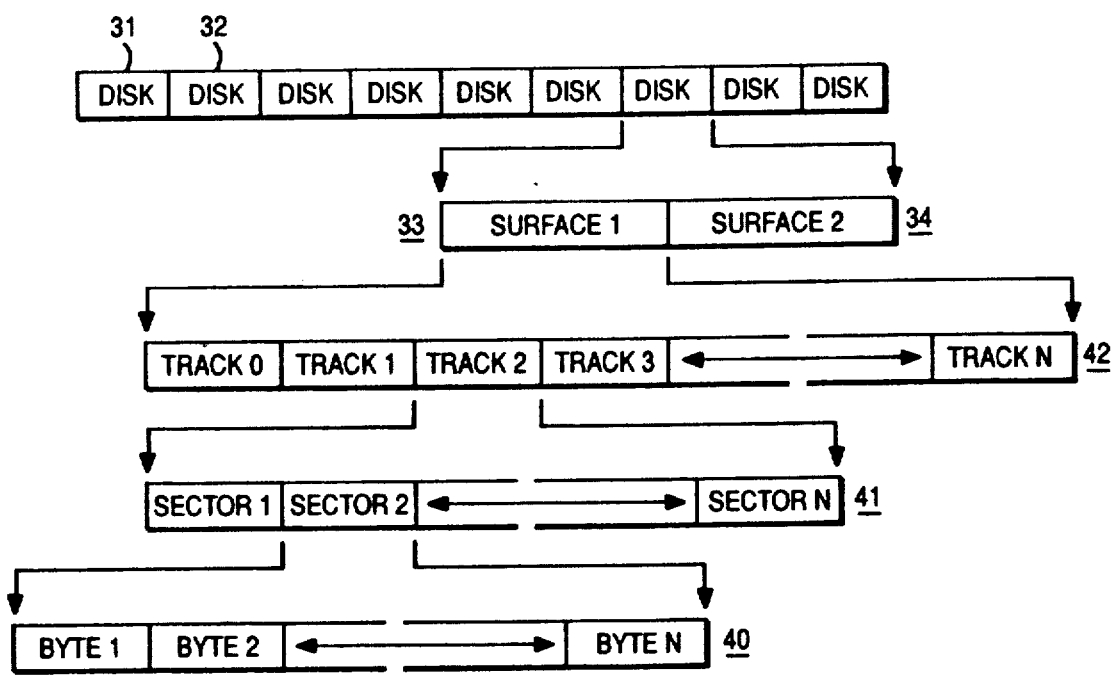
FIG. 4 is a diagram illustrating the physical relationships of various physical storage components employed in the real addressing architecture of a disk file.

FIG. 4 illustrates the physical relationship of the various storage elements involved in the addressing architecture of a disk drive which to a large extend is generally standardized in the industry.

Each byte position 40 stores one byte of data. The sector or block 41 comprises a specified plurality of sequential or contiguous byte positions generally 512 and is the lowest level of an addressable element. Blocks 41 are combined into tracks 42, which are combined into surfaces 33 and 34, which are combined into disks 31, 32 . . . , which are combined into disk drives or disk storage devices 171. If more than one disk storage device 17 is employed the combination of two or more devices is referred to as a physical string of disk drives or disk files. In practice a disk or a disk track 42 may contain one or more sectors 17 having a number of defects sufficient to rendered the block unusable.

For a clearer understanding of the present invention, it should be assumed in the following discussion that the surfaces do not include any bad blocks. The practicalities involved in dealing with bad blocks in the address translation schemes is addressed in the discussion merely to avoid any implication that the present invention might be rendered inoperable in the environment of a disk drive which includes one or more blocks which were unusable.

Each physical volume, for example each separate disk drive, reserves an area of the volume for storing information that is used by the system when the power is first turned on. This is now a standard convention in the industry where, for example, tracks or cylinders 0-4 are reserved for special information.

Each physical volume reserves at least two cylinders for special use. In addition, some area of a physical volume may be reserved for holding Boot Code, from which a system boots or starts up. The Boot Code may be used to load diagnostics software, or the kernel of the Operating System.

The first reserved cylinder is cylinder 0, the first cylinder on any physical volume. Each physical volume uses the first four tracks of cylinder 0 to store various types of configuration and operation information about the Direct Access Storage Devices (DASD) that are attached to the system. Some of this information is placed on the cylinder by the physical volume manufacturer, and some of it is written by the operating system on the first 4 tracks of cylinder 0.

The second reserved cylinder on the physical volume is for the exclusive use of the Customer Engineer and is called the CE cylinder. This is always the last cylinder on the physical volume and is used for diagnostic purposes. The CE cylinder cannot be used for user data. The Boot Code area and the Non-Reserved area are pointed to by the contents of an IPL Record interpreted in the context of the contents of a Configuration Record.

The IPL Record consisting of one block contains information that allows the system to read the Boot Code (if any) and initialize the physical volume. The IPL Record can be divided into four logical sections: The first section is the IPL Record ID. The second section contains format information about the physical volume. The third section contains information about where the Boot Code (if any) is located and its length. The fourth section contains information about where the non-reserved area of the physical volume is located and its length.

The Configuration Record, consisting of one block contains information required by the physical volume for all I/O operations other than reading the IPL Record, Configuration Record, or Backup Configuration Record. The Configuration Record fields include such items as the Configuration Record ID, the number of sectors available after formatting, interleave factor to be used to read anything other than the IPL Record, the Configuration Record, or the Backup Configuration Record, the number of bytes per sector used to read anything other than the IPL Record, the Configuration Record, or the Backup Configuration Record.

A bad block directory is also provided to keep a record of the blocks that have been diagnosed as unusable. It will be assumed in the remaining description that there are no bad blocks on the disk or if there are they are handled by any of the well known prior art techniques.

One track is also reserved for the Power On System Test (POST) control block that is created in memory during system initialization.

The layout of the non-reserved area of a Physical Volume is shown in FIG. 5. The first part of the non-reserved area of a physical volume contains the Physical Volume Descriptor, Logical Volume Descriptor, Volume Group Descriptor, and Name Descriptor Area. To save space on the physical volumes, the size of this area is variable. It is dependent on the size of the physical volume and the number of logical volumes allowed in the volume group. The physical volume descriptor contains one entry for each physical partition that will fit on the physical volume. For example, a 200 megabyte physical volume with a physical partition size of 1 megabyte will have a physical volume descriptor with 200 physical partition entries. The logical volume descriptor will contain entries for the maximum number of logical volumes allowed in the volume group, which is specified when a volume group is created, e.g., 128.

The layout of the non-reserved area shown in FIG. 5 is of a 200 megabyte physical volume with a physical partition size of 1 megabyte and the default maximum number of 128 logical volumes in the volume group. All numbers are in a hexadecimal notation.

It should be assumed that the physical address given is the offset (in sectors) from the beginning of the non-reserved area of the physical volume.

Each physical volume contains a table called a Physical Volume Descriptor indicating the status of the physical volume and its physical partitions. The size of the Physical Volume Descriptor is directly proportional to the size of the physical volume it is describing. It contains a descriptor header and one entry for each physical partition that the physical volume can contain. The Physical Volume Descriptor in the embodiment is duplicated on the same physical volume, is not contained within any physical partition, and has the format shown in FIG. 6.

It should be noted that there is not explicit relationship between physical block number and DASD device geometry. A physical partition should be allocated on DASD is such a way as to optimize access to its physical blocks. The Physical Volume Descriptor should be allocated on DASD in such a way as to reduce the probability of a single failure obliterating both copies of it.

Figure 6A:
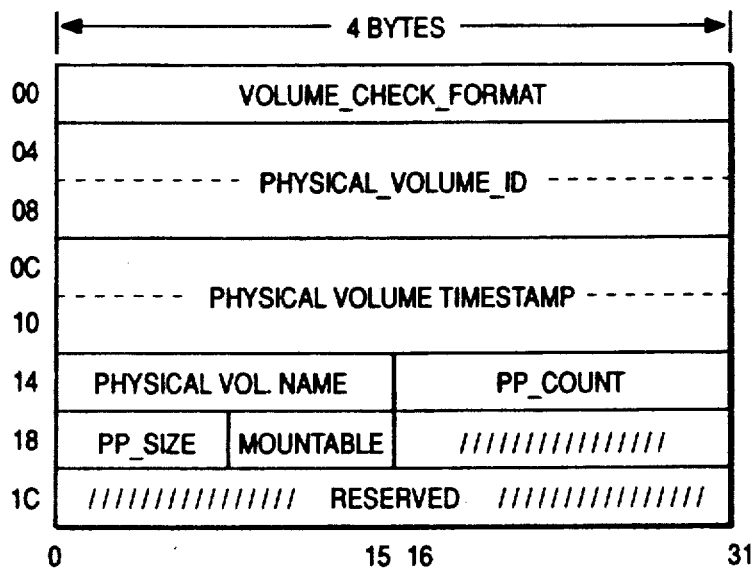
FIG. 6a illustrates the details of the Physical Volume Descriptor Header Data Structure shown in FIG. 6.

The details of the Physical Volume Descriptor Header shown in FIG. 6 is illustrated in FIG. 6a. The Physical Volume Descriptor Header contains information about the physical volume and about the contents of the physical partition map, and has the format shown in FIG. 6a.

The various fields within the Physical Volume Descriptor Header are interpreted as follows:

VOLUME_CHECK_FORMAT is used to determine whether the physical volume has been initialized to contain data conforming to Operating System standards. In addition, this field may be used to indicate the version and release levels of the information on the disk.

PHYSICAL_VOLUME_ID is a 64-bit number uniquely and universally identifying a physical volume. This unique identifier should be thought of as having been assigned by the manufacturer of the physical volume, although it may be assigned by the Logical Volume Manager.

If the value contained in the "Unique Identifier" field of the Configuration Record (bytes 60-67) is nonzero when the physical volume is first installed in a system, the value is copied into the PHYSICAL_VOLUME_ID field of the Physical Volume Descriptor Header, and is used from that point on by the Logical Volume Manager as the unique identifier for the physical volume.

PHYSICAL_VOLUME_TIMESTAMP contains a copy of the contents of the Processor Time-Of-Day Clock, indicating when the Physical Volume Descriptor was most recently updated.

PHYSICAL_VOLUME_NAME is a 16-bit offset into the Name Descriptor Area indicating the name of this physical volume. PHYSICAL_VOLUME_NAME is either null (0×0000), or its points to a field formatted as a null-terminated string of between 0 and 255 ASCII characters. By convention, PHYSICAL_VOLUME_NAME points to the name of the special file (e.g., /dev/pv0) associated with the physical volume.

PP_SIZE indicates the size of the physical partitions on the physical volume. PP_SIZE is an integer in the range from 16 to 28, and is assigned by a system administrator. The size of every physical partition in the volume group containing this physical volume is: 2 to an exponent between 16 and 28 specified by the value of PP_SIZE.

MOUNTABLE specifies whether the physical volume is mountable.

PP_COUNT indicates the maximum number of physical partitions that may be allocated on the physical volume. PP_COUNT is an integer in the range of 1 to 1023, and is computed by the Logical Volume Manager from the number of physical blocks supported by the physical volume and the size of each physical partition.

Figure 6B:
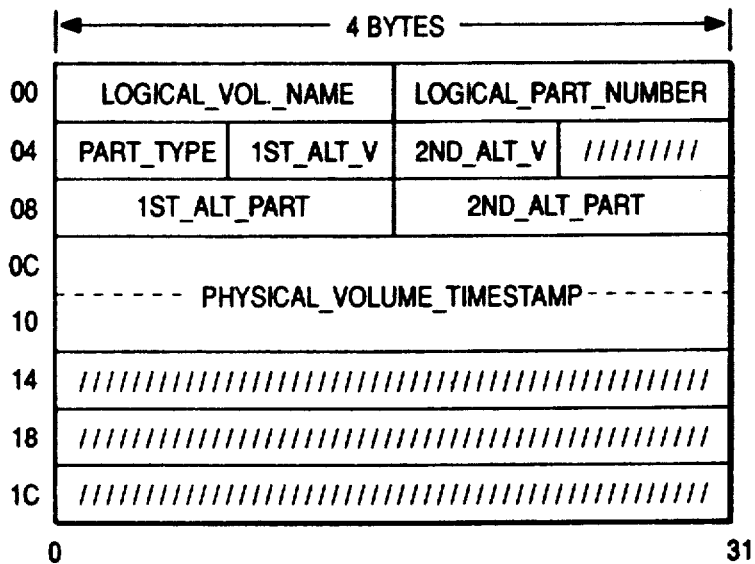
FIG. 6b illustrates the details of the Physical Partition Map Entry Data Structure format shown in FIG. 6.

The details of a Physical Partition Map Entry is illustrated in FIG. 6b.

The physical partition map contains a set of up to 1023 physical partition map entries, each describing one physical partition within the physical volume, and having the format shown in FIG. 6b where bit numbers are decimal. Byte offsets are hexadecimal. Slashes ("//") indicate a reserved field.

LOGICAL_VOLUME_NAME is a 16-bit offset into the Name Descriptor Area indicating the name of the logical volume containing this physical partition. LOGICAL_VOLUME_NAME is either a null pointer, or it points to a field formatted at a null-terminated string of between 0 and 255 ASCII characters. By convention, LOGICAL_VOLUME_NAME points to the name of the special file (e.g., /dev/hd0) associated with the logical volume.

LOGICAL_PARTITION_NUMBER indicates the logical partition represented by this physical partition, within the logical volume containing this physical partition. LOGICAL_PARTITION_NUMBER is an integer in the range of 0 to 4095, and is assigned by the Logical Volume Manager.

PART_TYPE indicates the type of the physical partition, and may be interpreted as follows:

0×00: Partition unusable.
0×01: Not allocated.
0×02: Only copy of a non-mirrored logical partition.
0×03: Primary copy of a singly mirrored logical partition.
0×04: Secondary copy of a doubly mirrored logical partition.

PHYSICAL_VOLUME_TIMESTAMP contains a copy of the contents of the Processor Time-Of-Day Clock, indicating when the Physical Volume Map Entry was most recently updated.

The fields 1ST_ALT_VOL, 1ST_ALT_PART, 2ND_ALT_VOL, PART all relate to information about mirrored copies. Since an understanding of how the mirroring function is managed in the preferred embodiment is not necessary to the present invention, it is not discussed.

It should be noted that the Physical Volume Descriptor must be updated in a specific manner in order for its contents to remain consistent in the face of system failure.

Each physical volume also contains a table called a Logical Volume Descriptor that describes the logical volumes in a volume group. The Logical Volume Descriptor contains a descriptor header and one entry for each logical volume up to the maximum number of logical volumes allowed in the volume group. This maximum is specified when a volume group is created. The default is for example 128. Every physical volume in the volume group contains an identical copy of the Logical Volume Descriptor.

Figure 6C:
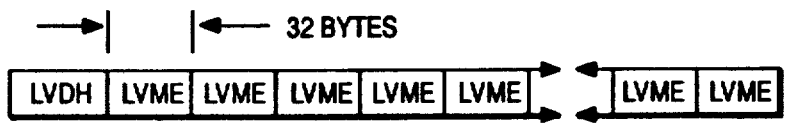
FIG. 6c illustrates the layout of the Logical Volume Descriptor Data Structure.

The Logical Volume Descriptor is duplicated on each physical volume, is not contained within any physical partition, and has the format shown in FIG. 6c. The Logical Volume Descriptor should be allocated on DASD in such a way as to reduce the probability of a single failure obliterating both copies of it.

Figure 6D:
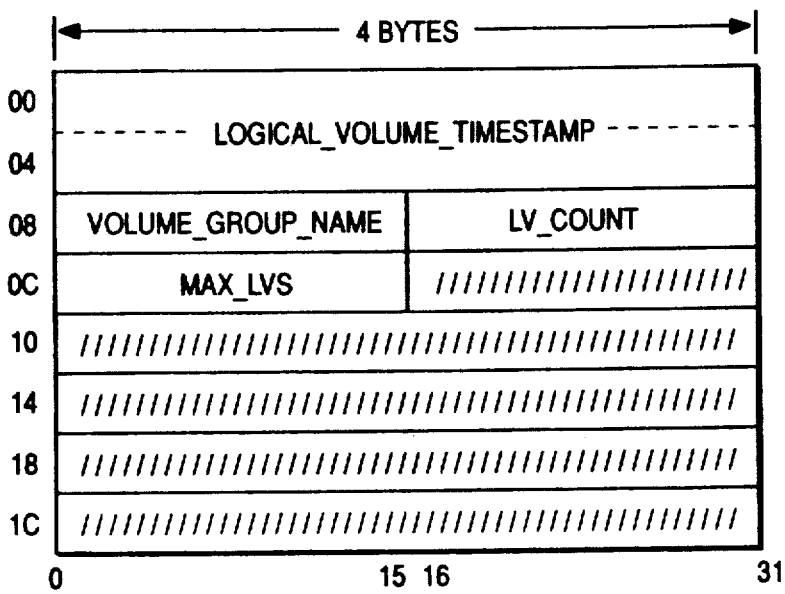
FIG. 6d illustrates the details of the Logical Volume Descriptor Header Data Structure shown in FIG. 6c.
Figure 6E:
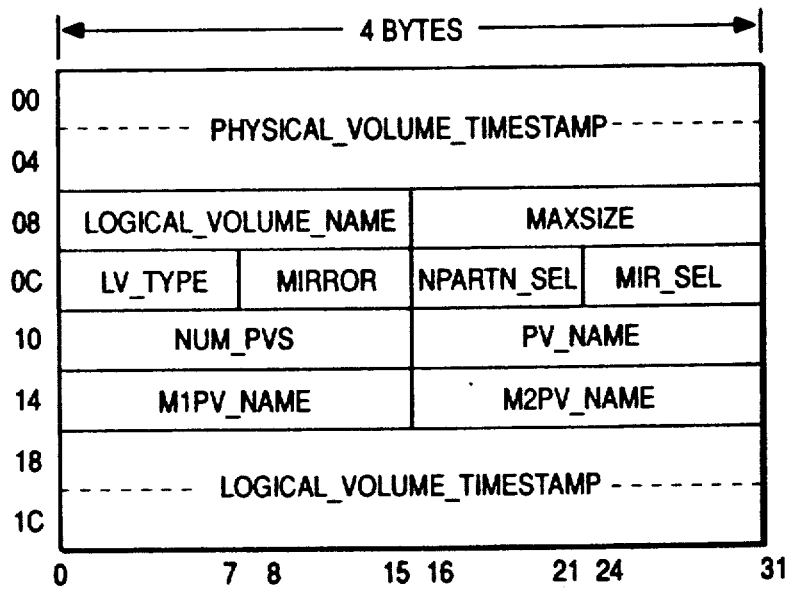
FIG. 6e illustrates the details of the Logical Volume Map Entry Data Structure shown in FIG. 6c.

The details of the Logical Volume Descriptor Header shown in FIG. 6c is shown in FIG. 6d. The Logical Volume Descriptor Heater contains information about the logical volumes in this volume group and has the format shown in FIG. 6d where bit numbers are decimal. Byte offsets are hexadecimal. Slashes ("//") indicate a reserved field.

The various fields within the Logical Volume Descriptor Header may be interpreted as follows:

LOGICAL_VOLUME_TIMESTAMP contains a copy of the contents of the Processor Time-Of-Day Clock, indicating when the Logical Volume Descriptor was most recently updated.

VOLUME_GROUP_NAME is a 16-bit offset into the Name Descriptor Ares indicating the name of the volume group containing this physical volume. VOLUME_GROUP_NAME points to a field formatted as a null-terminated string of between 0 and 255 ASCII character.

LV_COUNT indicates the number of logical volumes currently in the volume group. LV_COUNT is an integer in the range from 0 to MAX_LVS. MAX_LVS specifies the maximum number of logical volumes allowed inthe volume group. THis value is specified when the volume group is created. MAX_LVS is an integer in the range of 0 to 1023. If 0 is specified, the default of 128 is used.

The details of the Logical Volume Map Entry are shown in FIG. 6c. The logical volume map contains a set of logical volume map entries, each describing one logical volume within the volume group, and having the format shown in FIG. 6e where bit numbers are decimal, byte offsets are hexadecimal.

LOGICAL_VOLUME_ID contains a 64-bit number uniquely and universally identifying a logical volume. This unique ID is assigned by the Logical Volume Manager.

LOGICAL_VOLUME_NAME is a 16-bit offset into the Name descriptor area indicating the name of the logical volume. LOGICAL_VOLUME_NAME is either a null pointer, or it points to a field formatted as a null-terminated string of between 0 and 255 ASCII characters. By convention, LOGICAL_VOLUME_NAME points to the name of the special file (e.g., dev/hd0) associated with the logical volume.

MAXSIZE indicates the maximum size (in partitions) up to which this logical volume may grow.

VL_TYPE indicates the type of the logical volume and may be interpreted as follows:
0×00: Unknown. 0×01: Contains Operating System (OS) paging space.
0×02: Contains an OS log.
0×03: Contains an OS file system.
0×04: Contains an OS dump volume.
0×05: Contains a DOS file system.

MIRROR specifies whether this logical volume should be mirrored and the number of mirrors. MIRROR may be no mirroring, single mirroring, or double mirroring.

NPARN_SELECT indicates the algorithm number to be used when selecting the next physical partition for this logical volume.

MIRROR_SELECT indicates the algorithm number to be used when selecting a mirror for a logical partition for this logical volume.

NUM_PVS indicates the number of physical volumes each copy of a logical volume is limited to, or 0 if no limit.

PV_NAME is a 16-bit offset into the Name descriptor area indicating the name of the physical volume on which to begin allocating partitions for the logical volume.

M1PV_NAME is a 16-bit offset into the Name descriptor area indicating the name of the physical volume on which to begin allocating partitions for the primary mirror of the logical volume.

M2PV_NAME is a 16-bit offset into the Name descriptor area indicating the name of the physical volume on which to begin allocating partitions for the secondary mirror of the logical volume.

LOGICAL_VOLUME_TIMESTAMP contains a copy of the contents of the Processor Time-Of-Day Clock, indicating when the Logical Volume Map Entry was most recently updated.

Each physical volume also contains a table called a Volume Group Descriptor. The Volume Group Descriptor indicates the status of the volume group containing the physical volume. Every physical volume within a volume group contains an identical copy of the Volume Group Descriptor. The Volume Group Descriptor is duplicated on the same physical volume, is not contained within any physical partition, and has the format shown in FIG. 6f. The Volume Group Descriptor should be allocated on DASD in such as way as to reduce the probability of a single failure obliterating both copies of it.

Figure 6F:
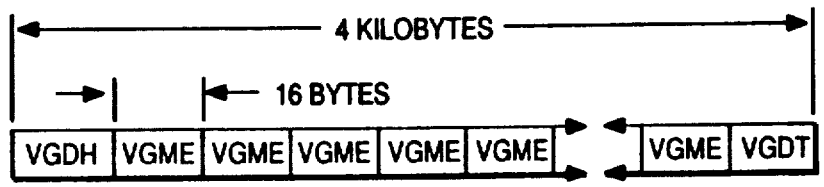
FIG. 6f illustrates the layout of the Volume Group Descriptor Data Structure.
Figure 6G:
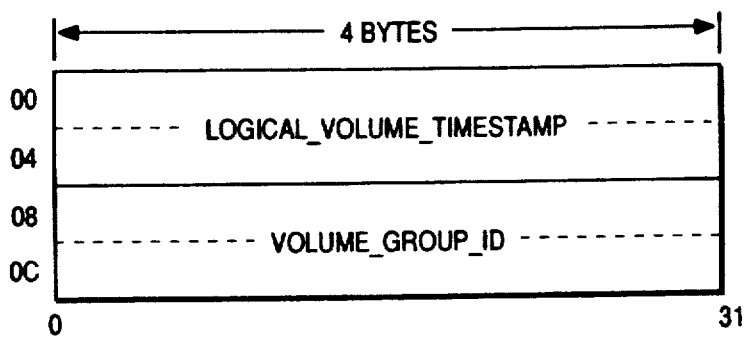
FIG. 6g illustrates the details of the Volume Group Descriptor header Data Structure Shown in FIG. 6f.

The details of the Volume Group Descriptor Header are shown in FIG. 6f. The Volume Group Descriptor Header contains information about the volume group and about the contents of the volume group map, and has the format shown in FIG. 6g where byte offsets are hexadecimal.

The various fields within the Volume Group Descriptor Header are interpreted as follows:

VOLUME_GROUP_TIMESTAMP contains a copy of the contents of the Processor Time-Of-Day Clock, indicating when the Volume Group Descriptor was most recently updated.

VOLUME_GROUP_ID contains a 64-bit number uniquely and universally identifying a volume group. This unique identifier is assigned by the Logical Volume Manager.

Figure 6H:
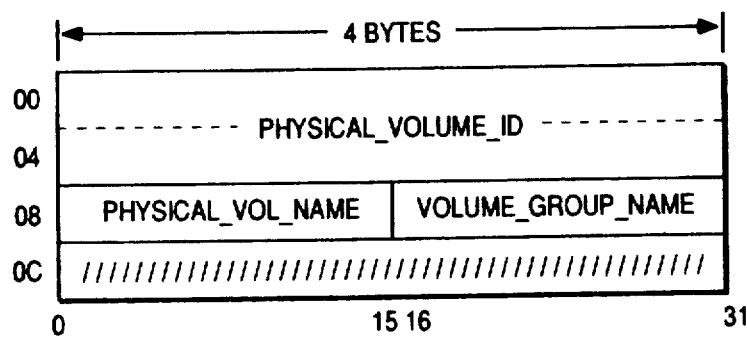
FIG. 6h illustrates the details of the Volume Group Map Entry Data Structure shown in FIG. 6f.

The details of a Volume Group Map Entry are shown in FIG. 6h. The volume group map contains a set of 254 volume group map entries, each describing one physical volume within the volume group, and having the format shown in FIG. 6h where bit numbers are decimal. Byte offsets are hexadecimal. Slashes ("///") indicate a reserved field.

The various field within a Volume Group Map Entry are interpreted as follows:

PHYSICAL_VOLUME_NUMBER contains a 64-bit number uniquely and universally identifying a physical volume. This unique identifier should be thought of as having been assigned by the manufacturer of the physical volume, although it may be assigned by the Logical Volume Manager.

PHYSICAL_VOLUME_NAME is a 16-bit offset into the Name Descriptor Area indicating the name of this physical volume.

PHYSICAL_VOLUME_NAME is either a null pointer, or it points to a field formatted as a null-terminated string of between 0 and 255 ASCII characters.

VOLUME_GROUP_NAME is a 16-bit offset into the Name Descriptor Area indicating the name of the volume group containing this physical volume. VOLUME_GROUP_NAME is either a null pointer, or it points to a field formatted as a null-terminated string of between 0 and 255 ASCII characters.

Figure 6I:
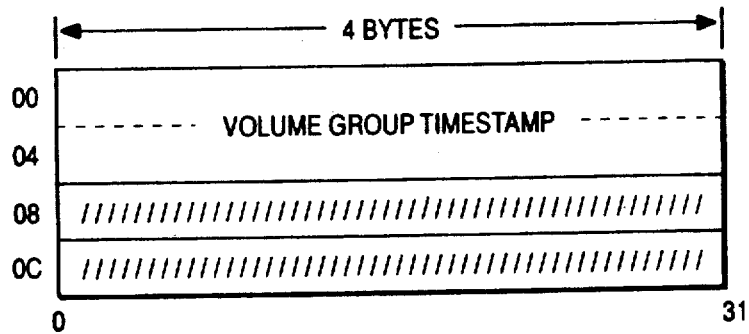
FIG. 6i illustrates the details of the Volume Group Descriptor Trailer Data Structure shown in FIG. 6f.

The details of Volume Group Descriptor Trailer are shown in FIG. 6i. The Volume Group Descriptor Trailer contains information about the volume group and about the contents of the volume group map, and has the format shown in FIG. 6i where bit numbers are decimal. Byte offsets are hexadecimal. Slashes ("///") indicate a reserved field.

VOLUME_GROUP_TIMESTAMP contains a copy of he contents of the Processor Time-Of-Day Clock, indicating when the Volume Group Descriptor was most recently updated.

The Name Descriptor Area referred to in the above description of the various data structures is an unformatted area containing the name character strings for the volume group and all physical volumes and logical volumes in the volume group. The size of the Name Descriptor Area corresponds to the maximum number of physical volumes and logical volumes in a volume group. The maximum number of logical volume for a volume group is created.

The Name Descriptor Area is not contained within any physical partition.

Figure 7:
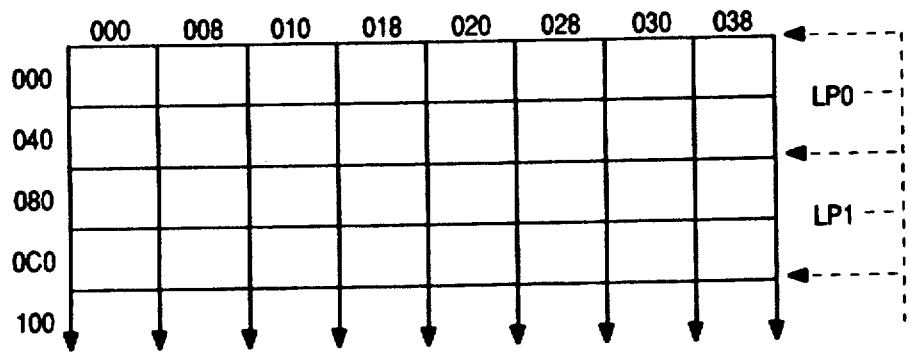
FIG. 7 illustrates the layout of a Logical Volume.

FIG. 7 indicates the layout of a logical volume where block numbers are decimal. Logical partition size shown is 64 Kilobytes (128 logical blocks).

In the preferred embodiment, the method of the present invention is implemented by a file named /dev/lvm which is called the Logical Volume Manager.

The Logical Volume Manager (LVM) provides the ability to create, modify and query logical volumes, physical volumes and volume groups. The LVM automatically expands logical volumes to the maximum size specified, dynamically as more space is needed. Logical volumes can span physical volumes in the same volume group and can be mirrored for high reliability, availability, and performance. Logical volumes, volume groups and physical volumes all have IDs that uniquely identify them from any other device of their type on any system.

The LVM comprises a number operations performed by calls to the IOCTL system call. The two IOCTL operations which are the most important to the method of the present invention are Create Logical Volume (CREATELV) and Install Physical Volume (INSTALLPV). Standard IOCTL data structures (not shown) are employed to store the information that is used in the various operations.

CREATELV creates a logical volume in the volume group specified. The createlv structure, contains the information needed to create a logical volume. The information is as follows;

The lvname field must point to a null terminate string that is less than or equal to 255 bytes.

The vg_id field specifies the volume group that will contain this logical volume.

The lvtype field specifies the type of logical volume, e.g., aging space, file system, etc.

The initsize field specifies the initial size of the logical volume in number of logical partitions.

The maxsize field specifies the maximum size of logical volume in umber of logical partitions (0 to 4096, where 0 means unconstrained maximum.

The pv_id field specifies the physical volume on which to begin allocating partitions for the logical volume.

The numpvs field contains the number of physical volumes each copy of a logical volume is limited to, or 0 if no limit.

The mirror fields specifies whether this logical volume should be mirrored and the number of mirrors.

The npartn_select field indicates the algorithm number to be used when selecting the next physical partition for this logical volume. mirror_select indicates the algorithm number to be used when selecting a mirror for a logical partition.

The m1pv_$ids$ and m2pv_ids fields indicate are the physical volumes on which to begin allocating partitions for the primary and secondary mirrors respectively. If no mirroring is specified, these fields should be NULL.

The logical volume manager will generate a unique ID for the logical volume and return it in the lv_id field in the CREATELV buffer.

Figure 8:
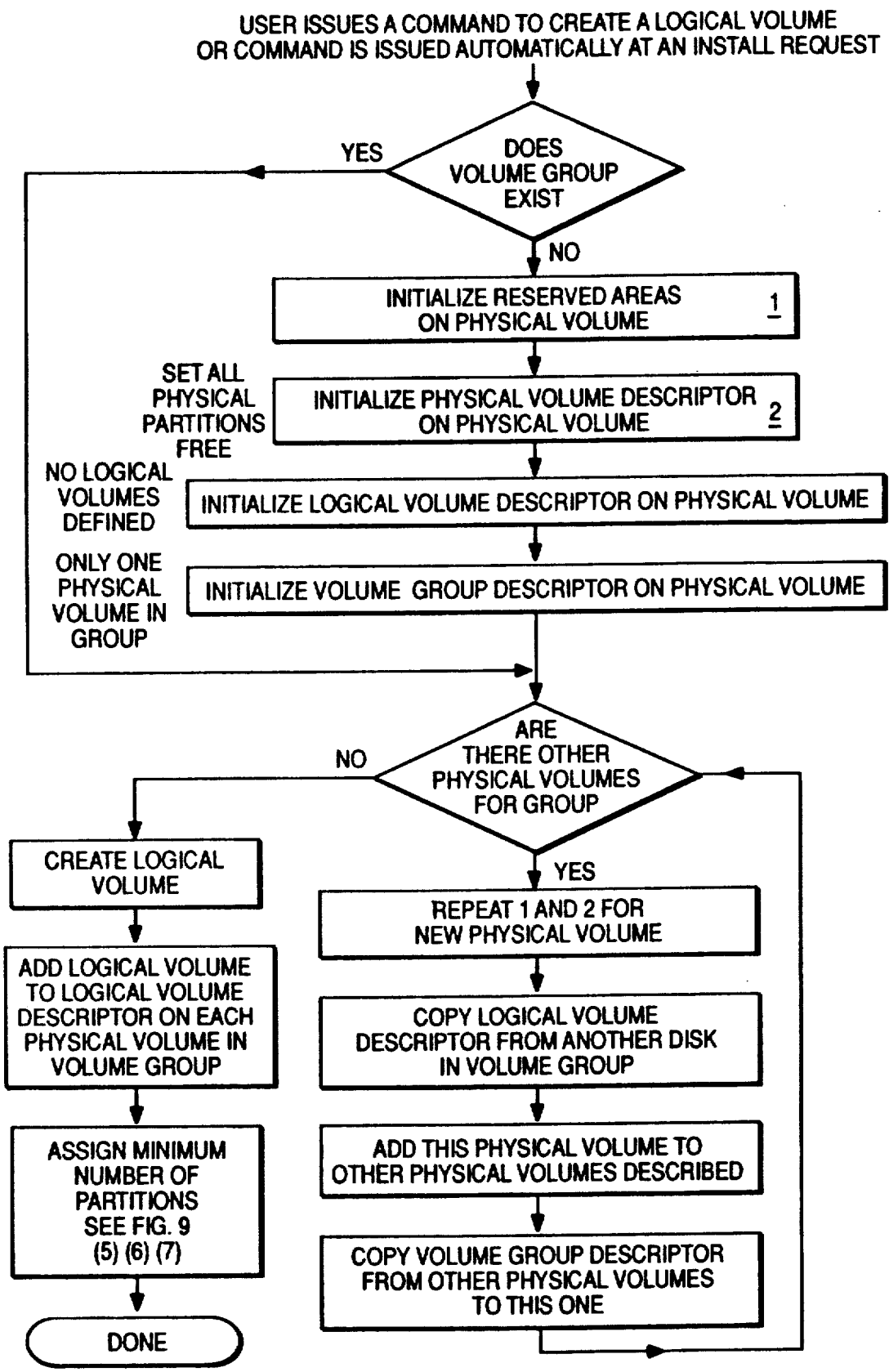
FIG. 8 is a flow chart illustrating the steps involved in initially installing a file system on the system shown in FIG. 1.

FIG. 8 is a flow chart of the steps involved in creating a volume group and is self explanatory.

The Install Physical Volume (INSTALLPV) system call functions to install a physical volume into the volume group specified. An AIX command issued by the system administrator calls the INSTALLPV IOCTL with the required parameters from the administrator. If the volume group specified does not exist, one will be created with the information provided. Each mountable physical volume must be in a volume group by itself.

The INSTALLPV structure contains the information needed to install a physical volume into the volume group specified and create the volume group if it does not exist. If the volume group specified exists, the ppsize, vgname and maxivs fields will be ignored. If the volume group does not exist, the logical volume manager will generate a unique ID for the volume group and return it in the vg_id field of the INSTALLPV buffer.

The name fields must point to a null terminated string that is less than or equal to 255 bytes.

The maxlvs field specifies the maximum number of logical volumes in this volume group. If 0 is specified, the default maximum number of logical volumes per volume group, 128, will be used.

The ppsize field indicates the size of physical partitions (in bytes) for all logical volumes in this volume group.

The mountable field specifies whether the physical volume is mountable (1) or not (0). The logical volume manager will generate a unique ID for the physical volume and return it in the pv_id field of the INSTALLPV buffer.

Figure 9:
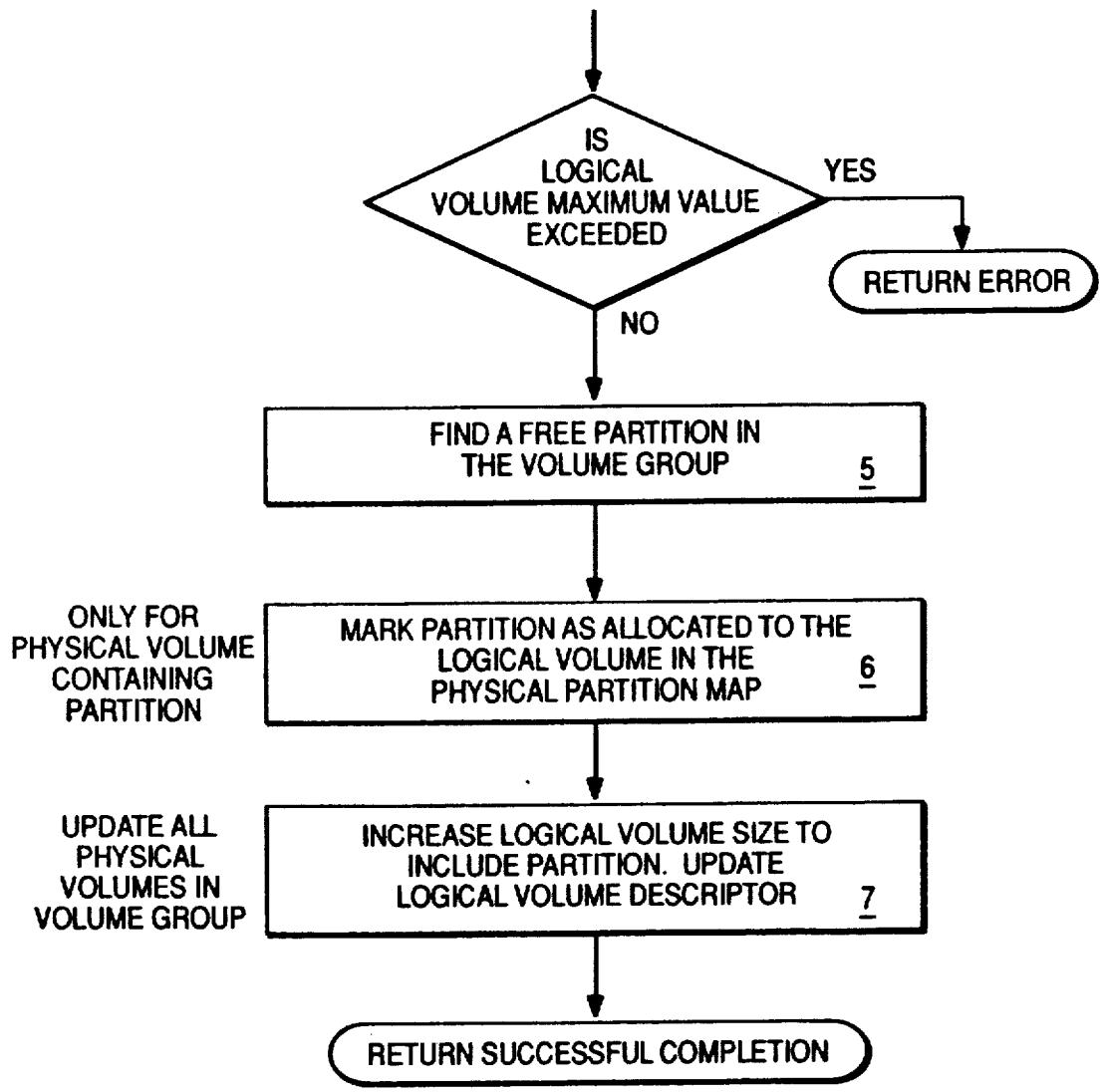
FIG. 9 is a flow chart illustrating the steps involved in dynamically incrementing the capacity of a previously established area to add new files related to the group of files stored originally in that area.

FIG. 9 is a flow chart of the steps involved in installing a physical volume. The flow chart is self explanatory.

Another pair of special files designated /dev/hdn and /dev/pdn support the logical volume device driver and the physical device driver.

The logical volume device driver and the physical volume device drivers provide block and character (raw) access to logical and physical volumes. The config device driver associates the minor device number to the logical volume. Normally, the special files, /dev/hdn and /dev/rhdn, are given the minor device number n. The logical volume with minor device number 0 is always the logical volume used to initially load the system program.

When performing raw I/O, the number of bytes to be read or written should be a multiple of 512 bytes (a logical block). Likewise, lseek system calls should specify a multiple of 512 bytes.

All operations on a given DASD are performed at the driving site for (the volume group containing) that DASD. In a cluster configuration each site keeps a table mapping volume groups to driving sites. This table is initialized during IPL and is part of Kernel Common Knowledge (KCK). Since there can be at most 255 driving sites and 255 volume groups in a cluster, this table can be represented in as few as 256 bytes of (pinned) storage.

The techniques used for mapping logical address to physical address and physical address to device address are described next.

Typically, although not always, access to DASD is by logical address, i.e., volume group, logical volume, logical block, rather than by physical address, i.e., volume group, physical volume, physical block.

A device driver handling a logical access request must map the logical address contained in the request to a physical address before it can act on the request.

A logical block may map from one to three physical blocks, corresponding to: (1) the primary copy of the logical block, (2) the secondary copy of the logical block (if any), and (3) the tertiary copy of the logical block (if any). Mirroring is performed while mapping a logical address to a physical address.

Figure 10:
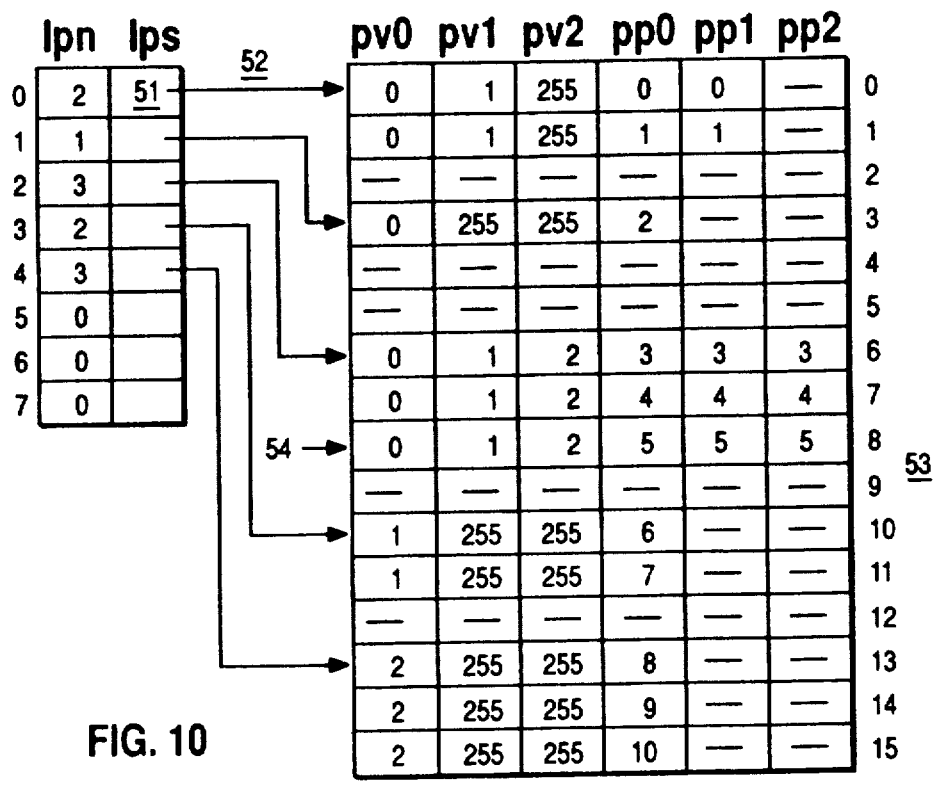
FIG. 10 illustrates a technique for mapping logical address to physical addresses.

FIG. 10 describes data structures that may be used to efficiently map a given logical address to its corresponding physical address. The small box 50 represents an array with an entry 51 for each logical volume in a volume group. An entry in this array contains two fields: (1) the number of logical partitions lpn (if any) allocated to the logical volume that it represents, and (2) a pointer lps 52 into the logical partition array 53.

The larger box 53 represents an array with an entry 54 for each logical partition in a volume group. A valid entry in this array contains six fields, which are used to describe a physical partition containing a copy of the logical partition, as follows:

1. pv0—the physical volume containing the primary copy,
2. pv1—the physical volume containing the secondary copy,
3. pv2—the physical volume containing the tertiary copy,
4. pp0—the physical partition containing the primary copy,
5. pp1—the physical partition containing the secondary copy, and
6. pp2—the physical partition containing the tertiary copy.

If one of the fields identifying a physical volume contains the number 255, no physical partition has been allocated for the corresponding copy of the logical partition.

To map a logical address to a physical address, the logical volume device driver running at the driving site: (1) indexes into the logical volume map by logical volume number, (2) finds the first entry in the logical partition map corresponding to the first logical partition contained within the logical volume, then (3) looks up the physical volume and physical partition corresponding to the correct copy of the logical partition.

The data structure described in FIG. 10 contains space for allocating additional logical volumes, and for allocating additional logical partitions to logical volumes. For example, entry 2 in the logical partition array has not been used, and may be used to allocated a third logical partition to logical volume 0.

A device driver handling a physical request must map the physical address contained within the request into a device address before it can act on the request. There is no architectural relationship between a physical address and its associated device address. Bad block relocation is performed while mapping a physical address to a device address. It is important to note that many disks perform some amount of bad block relocation themselves.

A possible technique that may be used to map a physical address to a device address is described next.

Figure 11:
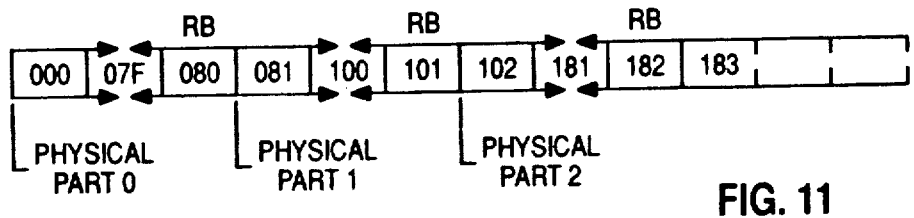
FIG. 11 illustrates the track layout of partitions and relocated bad blocks employed in the technique shown in FIG. 12.

FIG. 11 depicts a device layout that facilitates bad block relocation, and mapping physical addresses to device addresses. In this figure, both physical and logical partitions are assumed to be 128 blocks in length. One spare block has been allocated for each physical partition. The spare block may be used, if necessary, to hold the contents of a relocated physical block—for this reason, the spare block is called a relocate block. A bad block in a given physical partition need not be relocated to the spare block located immediately after its physical partition. It is, however, desirable that a bad block be relocated to a spare block that is "near" it.

The arrangement of physical blocks shown in FIG. 11 allows for both efficient random and sequential access to the physical blocks in a physical partition, and for efficient bad block relocation. The amount of space allocated for bad block relocation under this scheme is 1/128th of the device, or less than one percent.

Depending upon the specific characteristics of a device, more or less space may need to be allocated to satisfactorily perform bad block relocation on that device.

Figure 12:
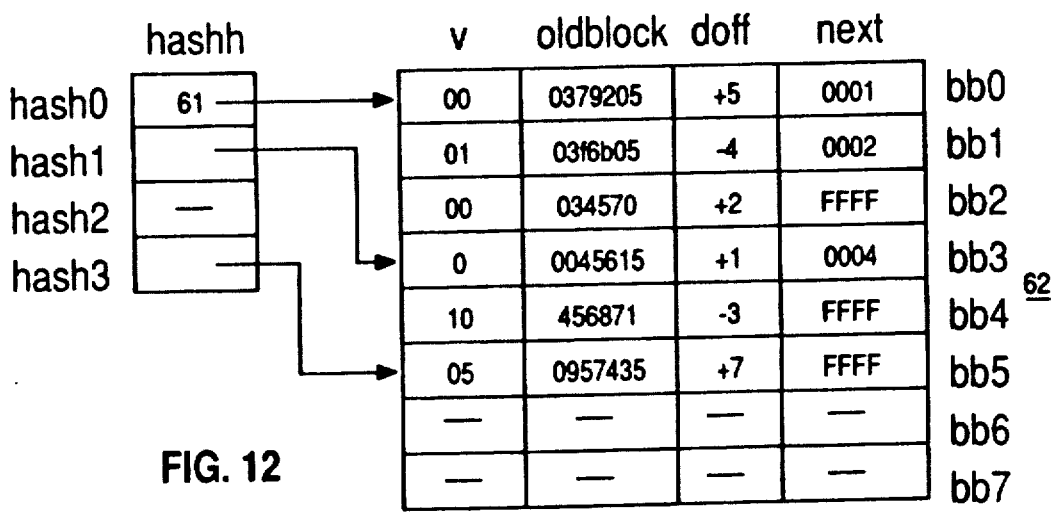
FIG. 12 illustrates a technique for mapping physical addresses to device addresses in the presence of a bad block.

FIG. 12 describes data structures that may be used to efficiently perform bad block relocation. The small box 60 represents a hash anchor table for bad blocks within a given physical volume. An entry 61 in this array may be either null, indicating that the corresponding hash chain is empty, or non-null, indicating that the corresponding hash chain is non-empty. If the entry is non-null, it points into the bad block table 62.

Array 62 has an entry for each bad block in a physical volume. A valid entry in this array contains four fields, which are used to describe a bad block, as follows:

1. v—the physical volume number containing the bad block,
2. oldblock—the physical block address of the bad block,
3. doff—the offset used to locate the relocate block, and
4. next—a pointer to the next element (if any) on the hash chain.

To map a physical address to a device address, the physical volume device driver running at the driving site: (1) locates the beginning of the physical partition, (2) locates the physical block address within the physical partition, (3) hashes the physical block address, and (4) searches the bad block hash chain for the physical volume number and physical block address. If found on the bad block hash chain, the physical block is bad and must be relocated; otherwise, the physical block is good, and should not be relocated. If the physical block must be relocated, the offset found in the entry containing the physical block address is added to the physical block address, and the result is the new device address that contains the contents of the relocated physical block.

The data structures shown in FIG. 12 contain space for mapping additional bad blocks. For example, the entries marked "bb6" and bb7" are currently unused.

Various modifications may be made in the details of the preferred embodiment described above, without departing from the spirit of the invention and the scope of the appended claims.

We claim:

1. A data processing method executed by a computerized data processing system for storing groups of related information in a storage subsystem of said system in which the subsystem includes one or more storage devices having a plurality of block addressable storage locations, each of which stores a predetermined fixed number of bytes of said information, said method including the following combination of sequential steps;
   A) establishing a plurality of addressable physical partitions from at least one of said storage devices, each of which comprises a predetermined number of said storage locations.
   B) initially allocating a preselected number of said partitions for one of said groups of related information, from said plurality of established partitions including the step of,
      (1) determining the minimum number of partitions required to store said one group of related information by reference to said predetermined number and the byte size in bytes of said one group,
   C) storing said one group in said minimum number of partitions,
   D) repeating steps B and C for each said group of related information whereby any one of said groups of related information stored in said minimum number of partitions may have said minimum number of partitions on different ones of said storage devices, and
   E) automatically allocating additional said partitions located physically on any one of said storage devices including the step of dynamically logically combining said additional partitions with said previously allocated said group of partitions to store additional information related to said information stored in said group, without changing the storage locations of previously stored said groups; and
   wherein said storage locations are addressable in a non-sequential order.

2. The method recited in claim 1 further including the step of
   F) establishing a Logical Volume data structure for identifying the plurality of said partitions that have been allocated to store individual files within the group of related information.

3. A method executed by a computerized data processing system for storing groups of related information files in said system having a plurality of storage devices with block addressable storage locations, said method including the following combination of sequential steps;
   A) establishing a plurality of physically non-contiguous logically contiguous addressable identifiable physical partitions within said plurality of storage devices, each one of said partitions comprises a predetermined fixed number of said block addressable storage locations of said storage devices, said storage locations being addressable in non-sequential order,
   B) selecting said predetermined number in accordance with a size of individual files in a related group,
   C) assigning a least number of identified physical partitions, from any one of said storage devices, required for storing each said group of related information files,
   D) storing each said group in said least number of identified said partitions, whereby any one of said groups is stored in said least number of partitions on different ones of said storage devices, and
   E) automatically allocating additional said partitions located physically on any said device including the step of dynamically logically combining said additional partitions with said previously allocated partitions assigned to said group of partitions to store additional information related to said information files stored in said group.

4. The method recited in claim 3 in which said system has an operating system including an install system utility and a create system utility including the further step of
   F) creating a volume group by allocating one or more physical storage devices with an indication of the partition size and the identity of said volume group by executing said create system utility.

5. The method recited in claim 3 in which said system has an operating system including an install system utility and a create system utility including the further step of
   G) creating a Logical Volume comprising a plurality of identified partitions for storing a said group of files by issuing a said create system utility with an indication of the identity of said group of files to be installed.

6. The method recited in claim 4 including the further step of
   H) installing a said group of related information files on said devices by issuing an install system call with an indication of the identity of said group to be installed.

7. The method recited in claim 5 including the further step of
   I) determining the least number of partitions required to store said one group of related information by reference to said predetermined number of blocks and the byte size in bytes of said one group.

8. A method executed in a computerized data processing system for utilizing disk blocks on a plurality of physical storage devices in said system, said method comprising:
   A) creating a logical volume having a size of a least number of physical partitions, each having a predetermined fixed number of disk blocks, required for storing a plurality of files within a related group of information; and
   B) automatically increasing the size of said logical volume by allocating an additional at least one physical partition, from any one of said storage devices, to said created logical volume, when any one of said plurality of files increase in size, whereby said logical volume of said related group of information spans said plurality of physical storage devices; and
   where said storing of said files is in non-sequential order.

9. The method of claim 3 wherein said step of creating comprises the further step of establishing each of said plurality of partitions from physically contiguous addressable blocks within a single disk.

10. A method executed in a computerized data processing system for non-sequentially utilizing storage space on a plurality of non-sequential, tapeless physical disks in said system, said method comprising:
   (A) creating a logical volume;

(B) specifying an initial number of partitions from a first disk for said created logical volume;

(C) automatically allocating at least one of a plurality of additional partitions for said created logical volume when additional storage space is needed, wherein said allocated additional partitions reside on different ones of said plurality of non-sequential, tapeless physical disk; and further comprising the step of (D) storing files of data in said storage space in non-sequential order.

11. The method of claim 9 wherein said step of creating said logical volume comprises the further step of creating a partition map for specifying one of said plurality of physical disks, and for specifying a location of each one of said plurality of partitions on a corresponding one of said plurality of physical disks.

12. A method executed by a computerized data processing system of utilizing addressable block storage locations on a plurality of physical storage devices, said method comprising:

(A) combining a plurality of non-contiguous groups of logically contiguous addressable block storage locations spanning said plurality of storage devices to create a virtual disk; and (E) addressing said non-contiguous groups of addressable block storage locations as if said non-contiguous groups were contiguous; and (C) accessing said addressable block storage locations in non-sequential order.

13. A data processing system having a plurality of physical storage devices, said data processing system comprising:

means for creating a logical volume having a size of a least number of physical partitions, each having a predetermined fixed number of disk blocks, required for storing a plurality of files within a related group of information; and means for automatically increasing the size of said logical volume wherein said means for increasing said size includes means for allocating an additional at least one physical partition, from any one of said storage devices, to said created logical volume, when any one of said plurality of files increases in size, whereby said logical volume of said related group of information spans said plurality of physical storage devices; and means for non-sequential storing of said files in said storage devices.

14. A method executed by a computerized data processing system for utilizing storage space on a plurality of physical disks in a processing system having a volume group, said method comprising (a) creating a logical volume;

(b) specifying an initial number of partitions from a first disk for said created logical volume;

(c) dynamically allocating on different ones of said plurality of disks at least one of a plurality of additional partitions for said created logical volume when additional storage space is needed, where said dynamic allocation comprises monitoring free space in said volume group; and installing a physical volume into said volume group as a function of said monitoring; and wherein said method further comprises storing files in said storage space in non-sequential order.

15. The method of claim 14 wherein said installing is in response to a system call.

16. The method of claim 15 wherein said system call is INSALLPV.

17. The method of claim 14 further including creating one of said logical volumes in response to said installing said physical volume.

18. The method of claim 17 further including allocating physical space for said one of said logical volumes.

19. The method of claim 17 wherein said step of creating said one of said logical volumes is in response to a system call.

20. The method of claim 19 wherein said system call is create CREATELV.

21. The method of claim 14 further including extending an existing one of said logical volumes in response to said installing said physical volume.

22. The method of claim 14 wherein said system includes at least one file system and wherein data structures in said file system are modified in response to said installing of said physical volume.

23. The method of claim 21 wherein said system includes at least one file system and wherein data structures in said file system are modified in response to said extending of said logical volume.

* * * * *

UNITED STATES PATENT AND TRADEMARK OFFICE
CERTIFICATE OF CORRECTION

PATENT NO. : 5,129,088

DATED : Jul. 7, 1992

INVENTOR(S) : Marc A. Auslander et al

It is certified that error appears in the above-identified patent and that said Letters Patent is hereby corrected as shown below:

Col. 2, line 18, delete "in" and insert --if--;

Col. 4, line 28, delete "when" and insert --When--;

line 28, delete "groups" and insert --group--;

Col. 6, line 62, delete "tot he" and insert --to the--;

Col. 7, line 17, delete "extend" and insert --extent--;

Col. 9, line 3, delete "not" and insert --no--;

line 38, delete the italics around "VOLUME" and insert --VOLUME--; without any italics;

Col. 11, line 22, delete "6c" and insert --6e--;

line 41, delete "VL_TYPE" and insert --LV_TYPE--;

line 43, delete "0X01: Contains Operating System";

line 44, insert --0X01: Contains Operating System-- before "(OS)";

line 67, delete "M1PV NAME is a" and insert --M1PV_NAME is a--;

Col. 13, line 6, delete "he" and insert --the--;

line 26, delete "LUM" and insert --LVM--;

line 37, after "number" insert --of--;

line 59, delete "umber" and insert --number--;

Col. 14, line 6, remove the italics from "ids and m";

Col. 18, line 54, delete "increase" and insert --increases--;

line 58, delete "where" and insert --wherein--;

UNITED STATES PATENT AND TRADEMARK OFFICE
CERTIFICATE OF CORRECTION

PATENT NO.  : 5,129,088             Page 2 of 2
DATED       : Jul. 7, 1992
INVENTOR(S) : Marc A. Auslander et al It is certified that error appears in the above-identified patent and that said Letters Patent is hereby corrected as shown below:

Col. 19, line 8, delete "disk" and insert --disks--;
         line 28, delete"(E)" and insert --(B)--;
Col. 20, line 15, delete "where" and insert --wherein--;
         line 25, delete "INSALLPV" and insert --INSTALLPV--; and
         line 47, delete "volume" and insert --volumes--.

Signed and Sealed this

Twenty-fourth Day of October, 1995

Attest:

BRUCE LEHMAN

Attesting Officer    Commissioner of Patents and Trademarks